(12) United States Patent
Pliss et al.

(10) Patent No.: US 8,812,809 B2
(45) Date of Patent: Aug. 19, 2014

(54) METHOD AND APPARATUS FOR ALLOCATING MEMORY FOR IMMUTABLE DATA ON A COMPUTING DEVICE

(75) Inventors: Oleg A. Pliss, Santa Clara, CA (US); Dean R. E. Long, Boulder Creek, CA (US); Erez Landau, Netanya (IL)

(73) Assignee: Oracle America, Inc., Redwood Shores, CA (US)

( * ) Notice: Subject to any disclaimer, the term of this patent is extended or adjusted under 35 U.S.C. 154(b) by 1346 days.

(21) Appl. No.: 12/136,653

(22) Filed: Jun. 10, 2008

(65) Prior Publication Data

US 2009/0307455 A1 Dec. 10, 2009

(51) Int. Cl.
*G06F 12/02* (2006.01)

(52) U.S. Cl.
USPC .......................................................... 711/170

(58) Field of Classification Search
CPC ...... G06F 12/08; G06F 12/023; G06F 12/121
USPC .......................................................... 711/170
See application file for complete search history.

(56) References Cited

U.S. PATENT DOCUMENTS

| | | | | |
|---|---|---|---|---|
| 6,701,520 | B1 * | 3/2004 | Santosuosso et al. | 717/152 |
| 6,817,011 | B1 * | 11/2004 | Reynolds | 717/130 |
| 2008/0098265 | A1 * | 4/2008 | Dmitrovich et al. | 714/710 |
| 2009/0031292 | A1 * | 1/2009 | Fulton et al. | 717/151 |

OTHER PUBLICATIONS

G. Chen, M. Kandemir, N. Vijaykrishnan, M. J. Irwin, B. Mathiske, and M. Wolczko. 2003. Heap compression for memory-constrained Java environments. In Proceedings of the 18th annual ACM SIGPLAN conference on Object-oriented programing, systems, languages, and applications (OOPSLA '03). ACM, New York, NY, USA, 282-301.*

Young Gil Park and Benjamin Goldberg. 1991. Reference escape analysis: optimizing reference counting based on the lifetime of references. In Proceedings of the 1991 ACM SIGPLAN symposium on Partial evaluation and semantics-based program manipulation (PEPM '91). ACM, New York, NY, USA, 178-189.*

ISRD Group, Introduction to Object Oriented Programming Through Java, Tata McGraw-Hill, 2007.*

* cited by examiner

*Primary Examiner* — Matthew Bradley
*Assistant Examiner* — Ramon A Mercado
(74) *Attorney, Agent, or Firm* — Park, Vaughan, Fleming & Dowler LLP; Mark Spiller

(57) ABSTRACT

One embodiment of the present invention provides a system that allocates memory for immutable data on a computing device. During operation, the system receives an application to be executed on the computing device. Next, the system allocates a memory region on the computing device to store immutable data for the application. Note that this memory region is smaller than the immutable data for the application. When the system subsequently receives a request to access a block of immutable data for the application, the system allocates space in this memory region for the block, and proceeds to load the block into the memory region. However, if at a later time the space occupied by this first block is needed for another block, the system unloads and discards the first block. If a subsequent operation needs to use information in the first block, the system regenerates the block by transforming raw data associated with the block into a form that can be directly accessed by the application, and then reloads the block into the memory region.

21 Claims, 7 Drawing Sheets

METHOD AND APPARATUS FOR ALLOCATING MEMORY FOR IMMUTABLE DATA ON A COMPUTING DEVICE

BACKGROUND

1. Field of the Invention

The present invention generally relates to memory management techniques for computing devices. More specifically, the present invention relates to techniques for allocating memory for immutable data on a computing device.

2. Related Art

A wide range of memory management techniques have been developed to facilitate sharing limited memory resources between programs executing on a computing device. For instance, paging mechanisms enable a program and its associated data to be split across non-contiguous memory. Virtual memory techniques separate the memory addresses used by a process from actual physical addresses and allow a virtual address space to exceed the physical memory size of the computing device. Such virtual memory techniques can increase the perceived amount of memory available to a program by swapping infrequently-used memory pages out to secondary storage.

Unfortunately, some computing devices, such as mobile phones, may include very limited amounts of memory, and may not include secondary storage that can be used as swap space. Consequently, an application that accesses a large set of data may be too large to run on such a memory-constrained device, because the memory is too small to hold the full application code and data set, and the operating system of the device cannot swap rarely-used data out of the device's main memory into secondary storage. As a result, the application and/or the data set may have to be modified considerably before the program can be successfully executed on such a memory-constrained device.

Hence, what is needed is a method that allows programs to run on memory-constrained devices without the limitations of existing techniques.

SUMMARY

One embodiment of the present invention provides a system that allocates memory for immutable data on a computing device. During operation, the system receives an application to be executed on the computing device. Next, the system allocates a memory region on the computing device to store immutable data for the application, wherein this allocated memory region is smaller than the immutable data for the application. When the system subsequently receives a request to access a block of immutable data for the application, the system allocates space in this memory region for the block, and proceeds to load the block into the memory region. However, if at a later time the space occupied by this block is needed for another block, the system unloads and discards the first block. If a subsequent operation needs to use information in the block, the system regenerates the block by transforming raw data associated with the block into a form that can be directly accessed by the application, and then reloads the block into the memory region.

In some embodiments, the system performs a set of operations upon raw data associated with the block to transform the raw data into a form that can be accessed directly by the application. The system then stores this transformed data into the space allocated for the block.

In some embodiments, the computing device includes a constrained memory space that cannot accommodate the entire application. Furthermore, the computing device may also include a constrained swap space that prevents the block from being swapped out. While discarding, regenerating, and reloading the block involves additional computational overhead, these operations facilitate executing programs that could otherwise not run given the constrained memory space and constrained swap space of the computing device.

In some embodiments, the system generates the immutable data for the application (e.g., at compile time), and partitions this immutable data into a set of uniformly-sized blocks.

In some embodiments, the system creates a function (e.g., at compile time) that performs the set of transformations upon the raw data. The system then calls this function when loading and/or re-loading the block into the memory region.

In some embodiments, the system reduces the memory used for immutable data during execution while ensuring the exception semantics for the application are not violated.

In some embodiments, the system identifies a target block to be evicted from the memory region. When all of the space in the memory has been allocated to other blocks, and more space is needed for an additional block, the system evicts this target block from the memory region.

In some embodiments, the system dynamically adjusts the size of the memory region while executing the application based on the memory needs of the application.

In some embodiments, the system detects any attempts to write to the block. When such an attempt is detected, the system prevents the block from being unloaded from the memory region.

In some embodiments, the immutable data includes both data that is read and/or written by application instructions as well as application instructions themselves.

DETAILED DESCRIPTION

Figure 1:
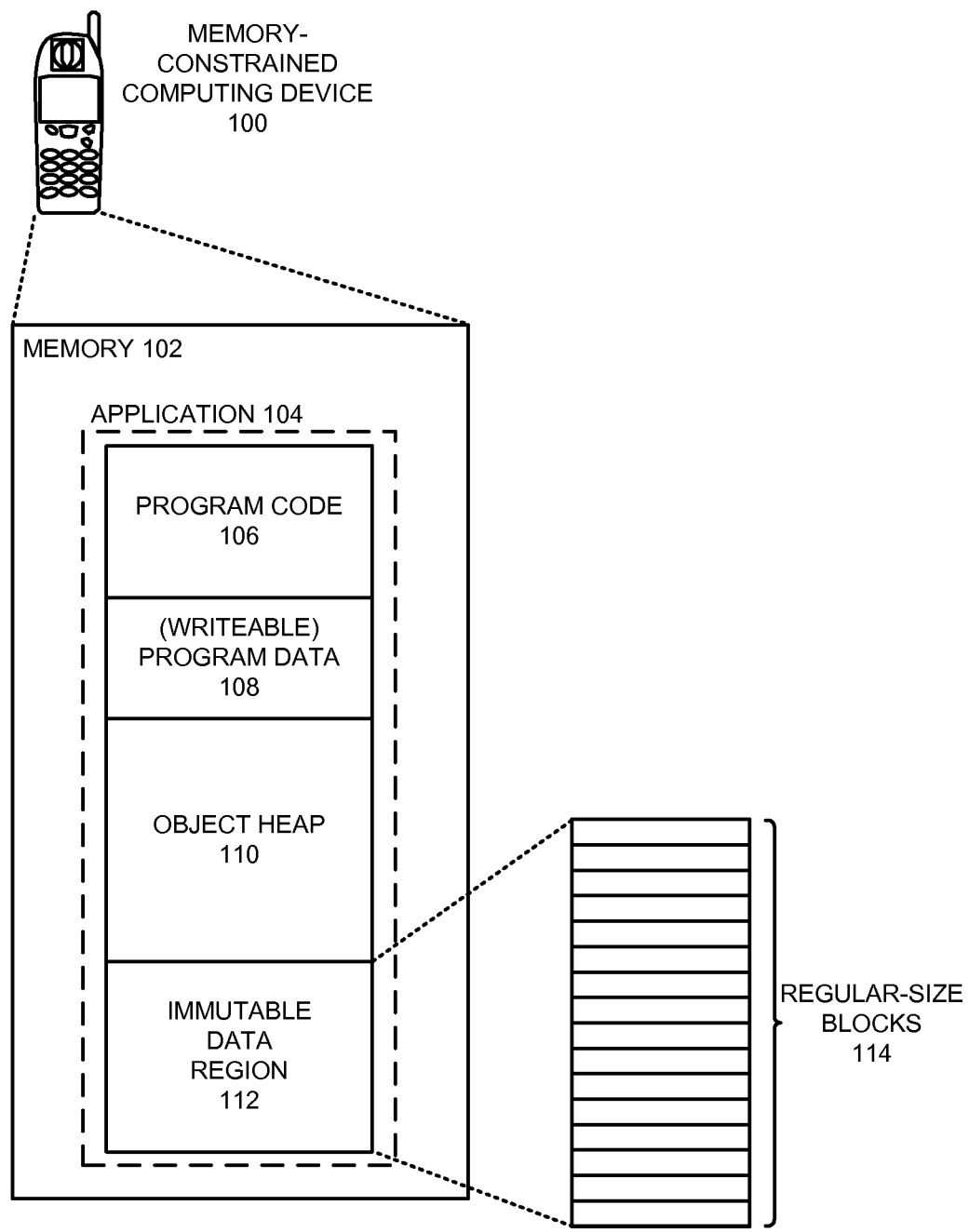
FIG. 1 illustrates a memory-constrained computing device in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Memory-Constrained Devices

Using memory-constrained devices involves a set of challenges that are typically not present for more powerful computing devices. For instance, some computing devices, such as mobile phones, may include relatively limited amounts of memory, and may not include secondary storage that can be used as swap space. During operation, the processor in such a device may load an application from a read-only memory (ROM) or a flash memory into main memory, and in the process may perform a set of transformations and checks to ensure that the application will run correctly. However, an application that accesses a large set of data may be too large to run on such a memory-constrained device, because the memory is too small to hold the full application code and the data set, and the operating system of the device cannot swap rarely-used data out of main memory into secondary storage. For example, an application that uses a JVM™ (Java™ Virtual Machine is a trademark of Sun Microsystems, Inc.) running on a memory-constrained device may need to access huge volumes of immutable data (such as the bytecodes and constant data associated with a set of class libraries), much of which may be rarely used but nonetheless consume memory. Because no mechanisms are available to let the operating system migrate such rarely-used immutable data from main memory to secondary storage, considerable modifications may need to be made to the application and/or the data set before the application can be successfully executed on such a memory-constrained device.

Note that the external representation of the unexecuted application (e.g., in the ROM or flash memory) is typically different from the internal representation (used in memory during execution), thereby preventing application code and data from being used directly from the external representation (or being copied in and used directly without modification, as with code and data overlays). Furthermore, language and runtime constraints may limit the ability to delay the load of such code and data. For instance, for programs written in Java™ (Java™ is a trademark of Sun Microsystems, Inc.), the Java™ standard strictly specifies exact semantics for: when data is loaded; how data is verified and initialized; and when an out-of-memory exception can be thrown. Specifically, Java™ requires that a class be loaded and verified upon first access, at which point the runtime environment performs a set of loading operations (including fixing position-dependent aspects in the data) and is allowed to signal an out-of-memory error. Delaying the loading of class data until a later moment can cause correctness issues, because the runtime environment may discover there is insufficient memory available for the load, but can no longer throw an out-of-memory exception (because at that point, the data should already have been loaded in memory following the described first-access policy). Note that while some less-constrained devices without such resource constraints may be subject to the same language and runtime constraints, such devices can load such data (in the timeframe specified by the standard) and then use virtual memory techniques to swap rarely-used portions of the data into secondary storage until needed again, thereby making memory space more readily available to applications that need additional memory space.

In one embodiment of the present invention, the system uses memory mapping and memory protection capabilities to virtualize access to immutable data at the application level while maintaining language semantics.

Managing Immutable Data for Memory-Constrained Devices

In one embodiment of the present invention, the system manages the loading of immutable data at the application level. In doing so, the system allocates a memory region for storing an application's immutable data, and provides mechanisms for unloading and re-generating (or re-creating) immutable data from this memory region during operation to reduce the memory load for memory-constrained devices.

At the time an application is compiled and/or loaded, the system identifies the immutable data in the application, and splits this data into a number of clusters (also referred to as immutable blocks). Each immutable block contains closely-related data that is likely to be used in the same timeframe. To simplify memory management, such immutable blocks are typically regular-sized, and sized to be a multiple of the device's physical page size (to improve efficiency and align with page-protection access mechanisms). Note that choosing a block size may involve considering a number of factors, such as internal fragmentation (for larger blocks) and increased block management overhead (e.g., due to needing larger tables to manage a large number of smaller blocks). In some embodiments, the block size can be configurable to accommodate application and/or device characteristics.

In some embodiments, the system may cluster immutable data automatically and/or manually. For instance, the system may cluster immutable data based on heuristics, static analysis of object connections using data graph analysis, and/or last-usage statistics. In one example, the system assumes that all bytecodes of a class and the class's superclasses are closely related and likely to be used at the same time, and the system performs a depth-first traversal of an application's class hierarchy to create blocks of a desired size based on this assumption. Such automatic clustering may be enhanced by manual modifications that handle dependencies that cannot be caught automatically. During operation, the system allocates a memory region in an application's address space for immutable data (hereafter also referred to as the "immutable region"), and then divides this immutable region into a set of regularly-sized blocks based on the block size. The system can then map immutable blocks into this memory region. Because (depending on memory space availability) there may not be enough physical memory available to simultaneously hold all of these immutable blocks, such immutable blocks may be loaded and/or unloaded from physical memory during operation on an as-needed basis.

FIG. 1 illustrates memory-constrained computing device 100. An application 104 that is executed in the memory 102 of memory-constrained computing device 100 includes program code 106, writeable program data 108, an object heap 110, and a memory region that contains immutable data 112. The system divides immutable data region 112 into a set of regular-size blocks of memory 114 to provide "virtual" access to different immutable blocks for application 104.

In one embodiment of the present invention, the system uses a set of operating system features to provide virtual-memory-like support for immutable data. For instance, some operating systems allow applications to register customized exception-handling functions with the operating system (e.g., by specifying such a customized exception handler in a call to the operating system). Such capabilities allow specialized handling for immutable blocks to be implemented at the application level without requiring any modifications to the operating system itself. For instance, the system may include a modified exception handler that, upon a page fault for an immutable block, can: generate (or regenerate) the immutable block; load the (re)generated immutable block into the immutable region; and then request that the operating system map the (re)generated immutable block into an associated logical memory range, thereby handling the page fault. Note that this process differs from existing virtual memory techniques in that the immutable block is generated (or regenerated) from a raw set of data instead of loaded in from secondary storage. Because the immutable blocks are constant, the system can, after updating a set of tracking information, discard immutable blocks as needed, and regenerate them again later when they need to be accessed again.

In one embodiment of the present invention, the system maintains a table of records (or "block descriptors") that stores attributes relating to loaded and unloaded immutable blocks. For instance, a block descriptor entry in this table may indicate for a given immutable block: a function pointer that points to a function that can exactly re-generate the data in the immutable block; a logical address used by an application to access data or instructions in the immutable block; whether the immutable block associated with the specified logical address is currently loaded into physical memory, and if so, a physical address associated with the immutable block; and statistical attributes that can be used to predict future activity for the immutable block based on historical activity. Note that the statistical attributes may include information provided by code libraries, the application, and/or the operating system.

Note that operating systems typically maintain tables that map logical memory addresses to physical memory addresses, similar to the mappings in the table of descriptor blocks. However, these operating system tables are typically not directly accessible from application space, and can only be changed from application space via "map" and "unmap" requests to the operating system. Hence, the table maintains a separate set of mapping information for immutable blocks to track which immutable blocks are currently loaded in the immutable region. As the system loads and unloads immutable blocks from physical memory, it notifies the operating system of the available mappings between logical and physical addresses, so that memory accesses for loaded immutable blocks are automatically facilitated by the operating system's tables.

At application startup, the system marks all of the entries in the table of block descriptors to be invalid. From there, some embodiments of the present invention enable the system to map immutable blocks either statically or dynamically. For static initialization, the system assigns a unique logical address to each immutable block at startup, and already writes the logical addresses for these blocks into associated entries in the table of block descriptor entries. Static initialization allows all addresses to be fixed at runtime, such that all references between immutable blocks are already resolved and addresses in blocks can be resolved without any address-patching. Alternatively, for dynamic initialization, the system delays fixing logical addresses for immutable blocks, and instead defines a base address and a logical address for an immutable block at the first use of the block. At first use, the system: determines a logical address for the immutable block; patches the addresses for the immutable block; allocates the next available (unused) entry in the table of block descriptors; and writes the logical address into the new entry. Note that dynamic initialization may depend upon an operating system allowing immutable data to be mapped at any address, and may require portions of an application to be patched at runtime to point to a dynamically-allocated set of logical addresses. Note also that, for both static and dynamic initialization, once the system determines a logical mapping for an immutable block, this mapping becomes permanent until the termination of the application. Fixing logical addresses ensures that, once an immutable block has been mapped, any references in the application (e.g., pointers) to that immutable block remain valid. For instance, dynamic initialization delays creating entries in the table until the first access of an immutable block. After this first access, portions of the application may have been patched to directly access data in the immutable block, and hence the logical address should not change. As a result, while the actual physical memory used to store an immutable block may change (as the block is unloaded and reloaded), the logical address for the block will never change once mapped (e.g., the immutable block will never move in the application's logical address space). Note that while the table of block descriptors may be statically or dynamically initialized with logical addresses for immutable blocks, the system can delay actually generating and loading the data for such blocks into physical memory until they are actually accessed.

Examples of dynamic and static initialization include aspects of class allocation in Java™. For instance, when the runtime system allocates a class of a given type in Java™, it accesses a root for the class which may only be accessible via a symbolic class name, and not accessible via a direct address. The class-loading process can use the symbolic class name and a class path to: find a file associated with the class; load a block of (immutable) data associated with class initialization from this file; and assign a logical address to the immutable block that enables application access to the loaded data. Hence, a logical address may not be used until an object of the given class is allocated, at which point the system can dynamically load the immutable data for the class and patch portions of the application that access the immutable block with the correct logical addresses. Alternatively, the system may process a Java™ library file to create a static image of the file's data, in the process statically initializing entries in the table for the immutable blocks from the library file.

Figure 2:
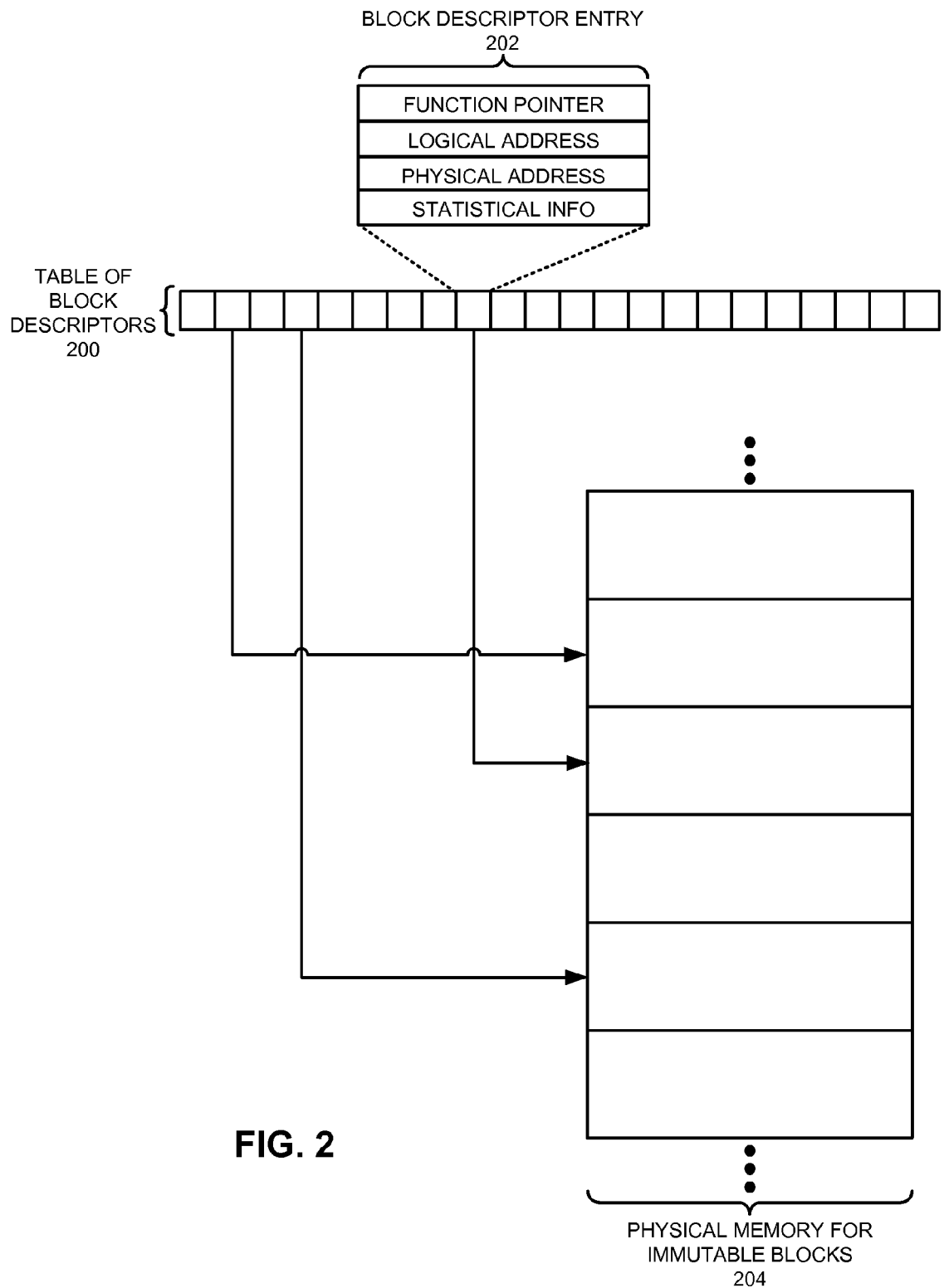
FIG. 2 illustrates a table of block descriptors that is used to manage a set of immutable blocks in accordance with an embodiment of the present invention.

FIG. 2 illustrates a table of block descriptors 200 that is used to manage a limited set of physical memory allocated for immutable blocks 204. Table of block descriptors 200 includes entries for the immutable blocks in the application, where each block descriptor entry 202 includes: a function pointer used to re-generate the contents of the immutable block; a logical address for the immutable block; a physical address for the immutable block (if it is currently loaded in the set of immutable blocks 204); and statistical information regarding historical activity for the associated immutable block (e.g., prediction heuristics, such as least-recently-used (LRU) information). In FIG. 2, block descriptor entries for immutable blocks that are currently in physical memory are illustrated using arrows from the given block descriptor entry to a physical memory block associated with the given immutable block. Immutable blocks not currently in physical memory typically will already have a block descriptor entry (except prior to first use when using dynamic initialization) with a function pointer, a logical address, and statistical information. A block descriptor entry may indicate that an associated immutable block is currently not in physical memory by entering an invalid address (e.g., "−1") in the physical address field. Note that, due to page alignment boundaries, some additional bits may be available in the fields storing logical and/or physical addresses. In some embodiments, the system may use such bits to indicate whether the physical address or the block descriptor entry (e.g., in the case of dynamic initialization of immutable blocks) is valid.

During operation, when the application attempts to access a logical address for an immutable block that is not currently loaded in physical memory, the system's modified exception handler traps the access. The system then determines how to load the to-be-accessed immutable block (or "needed block") into the immutable region. If one or more empty blocks are available in the immutable region, the system can use such blocks for the needed block. If no empty blocks are available in the immutable region, the system needs to evict another immutable block from physical memory before generating (or re-generating) and loading the needed block. The system: uses statistical information from the table of block descriptors to select another immutable block currently occupying physical memory that is unlikely to be used in the near future; uncommits the physical memory occupied by this other immutable block; and notes that the other immutable block is no longer loaded and/or mapped (e.g., by updating the associated entry in the table and sending an unmap request to the operating system). After finding space for the needed block, the system: executes the function that generates the needed block; loads the needed block into the available space; and then sends a request to the operating system to map the logical address for the needed block to the physical address the needed block has been loaded into. At this point, the needed block has been loaded into the address space of the application and the operating system can map the original access to a valid physical address, and the application can continue to execute.

Note that each immutable block has a unique logical address, such that immutable blocks do not overlap in the application address space. Hence, no fragmentation of the virtual area may occur, as each immutable block is allocated to its own logical address range. However, a given immutable block may be mapped to any slot of physical memory in the immutable region. As a result, at different times different immutable blocks may map to the same physical memory region. Immutable blocks can always be evicted from the immutable region, because they can always be recreated again if needed. Note that normally only immutable blocks can cause other immutable blocks in the physical memory of the immutable region to be evicted.

Figure 3:
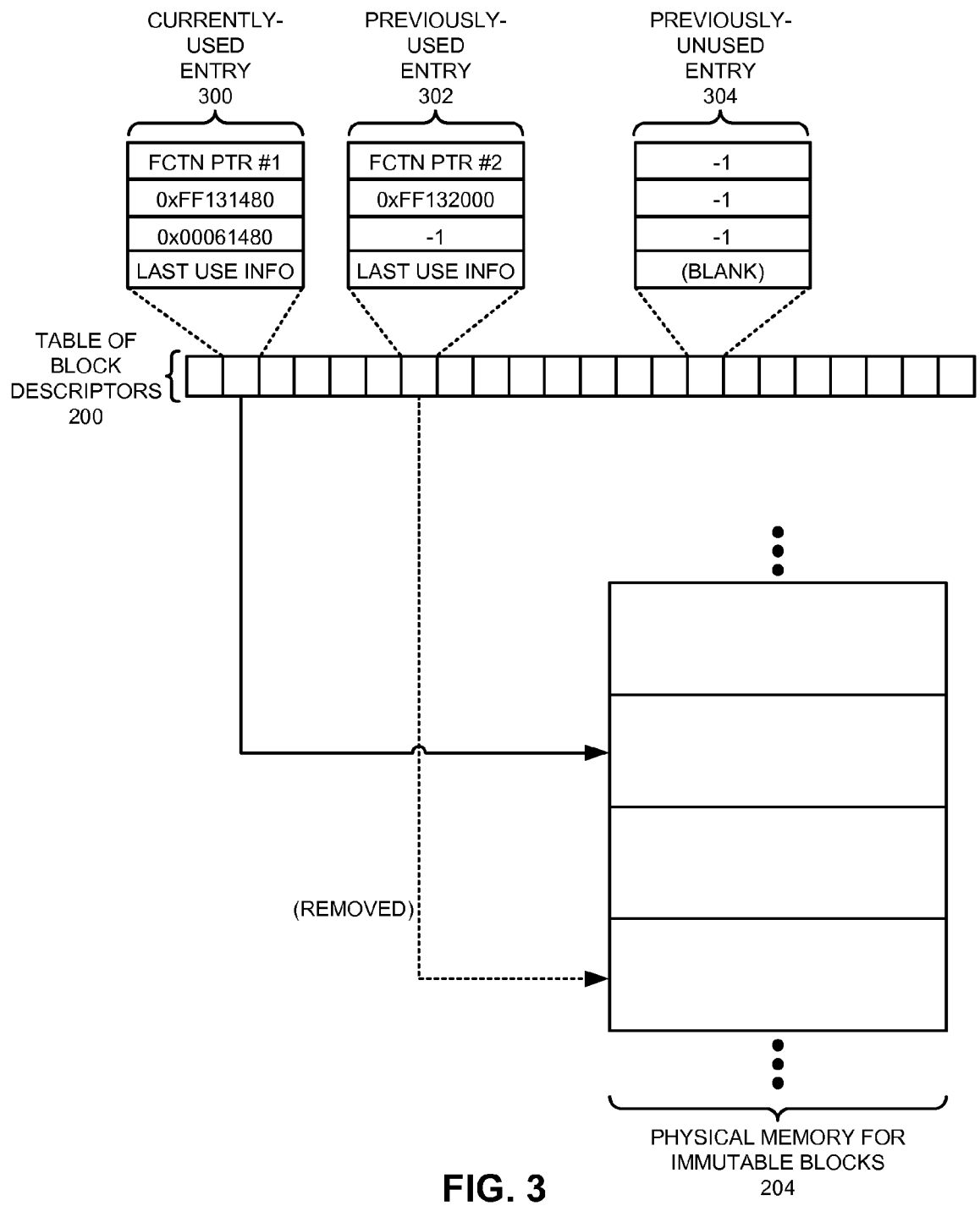
FIG. 3 illustrates several exemplary block descriptor entries in a table of block descriptors in accordance with an embodiment of the present invention.

FIG. 3 illustrates several exemplary block descriptor entries in table of block descriptors 200 during operation. Currently-used entry 300 includes: a function pointer that points to a function that re-generates an associated immutable block; a logical address for the start of the immutable block ("0xFF131480"); a physical address at which the immutable block is currently loaded ("0x00061480"); and last-use info for the immutable block. At the time the associated immutable block is loaded into physical memory, the system sends a request to the operating system mapping the logical address for the block to the associated physical memory region, thereby enabling the operating system to automatically access data in the associated physical memory region when the application accesses an address for the immutable block. Previously-used entry 302 illustrates the set of information associated with an immutable block that was previously, but is no longer, loaded in physical memory (as indicated in this example by the "−1" in the physical address field). The immutable block is still associated with a logical address ("0xFF132000") and a function pointer ("FCTN PTR #2") that can be used to re-generate the contents of the immutable block, and the block descriptor entry includes historical use information for the associated immutable block. At the time the immutable block associated with previously-used entry 302 is unloaded from physical memory 204, the system marks in the entry that the block is now unloaded, and requests that the operating system unmap the physical memory address associated with its logical address. A future attempt by the application to access the same logical memory region results in a page fault exception, during which the system can re-generate and re-load the immutable block into physical memory. Note that for static initialization, unused entries will have a format substantially similar to previously-used entry 302, because immutable blocks that have never been loaded have already been assigned a logical address and a block descriptor entry that identifies the function that generates the immutable block. Alternatively, for dynamic initialization, a previously-unused entry 304 has not yet been associated with an immutable block and/or logical address, and hence such an unused entry is "blank" and does not include this information until allocated and initialized.

Figure 4:
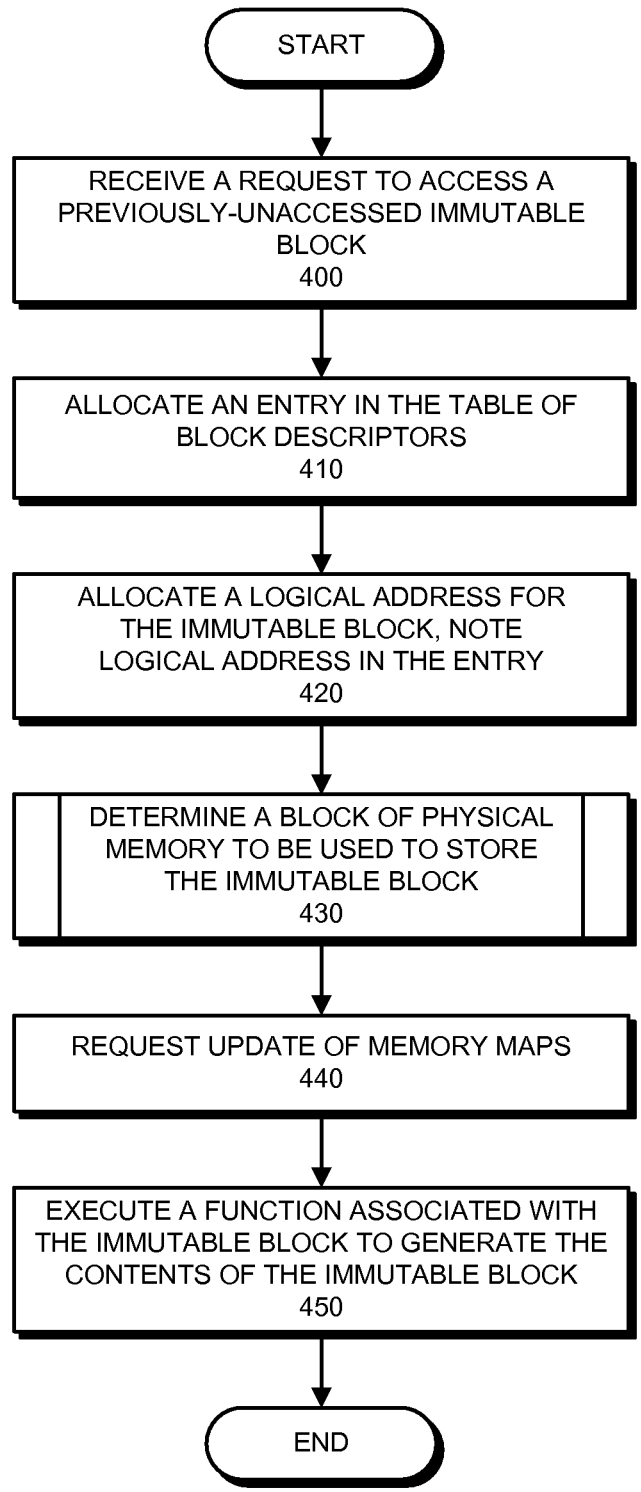
FIG. 4 presents a flow chart illustrating the process of dynamic initialization for the first use of an immutable block in accordance with an embodiment of the present invention.

FIG. 4 presents a flow chart illustrating the process of dynamic initialization for the first use of an immutable block. During operation, the system receives a request to access a previously-unaccessed immutable block (operation 400). Next, the system allocates an entry in the table of block descriptors (operation 410), allocates a logical address for the immutable block, and notes the logical address in the entry (operation 420). The system then identifies a block of physical memory in which the immutable block can be stored (operation 430), which may involve finding an empty block and/or evicting an existing block (as described below). Once physical memory is available, the system requests that the operating system update a set of memory maps to reflect that requests for addresses in the immutable block should access the associated block of physical memory (operation 440), and then executes a function associated with the immutable block to generate the contents of the immutable block (operation 450). For instance, the function may load the contents of the immutable block into physical memory, and may perform processing upon the loaded data. Alternatively, the function may generate the block contents without loading any data. Note that the function associated with each immutable block may perform a range of application-, function-, and/or block-specific actions when generating its associated immutable block, including (but not limited to) one or more of the following: directly loading data from secondary storage; reading and decompressing a set of compressed data from secondary storage; reading and applying changes to a set of shared data; reading a set of shared data and uncompressing a set of compressed changes to be applied to the shared data; performing address fix-up and resolving references for a set of loaded data to be stored in the immutable block; invoking an initializer encoded in a set of loaded data; filling the immutable block with zero-values; computing a table of values for the immutable block; and/or performing any combination of the above actions and/or other operations.

Figure 5:
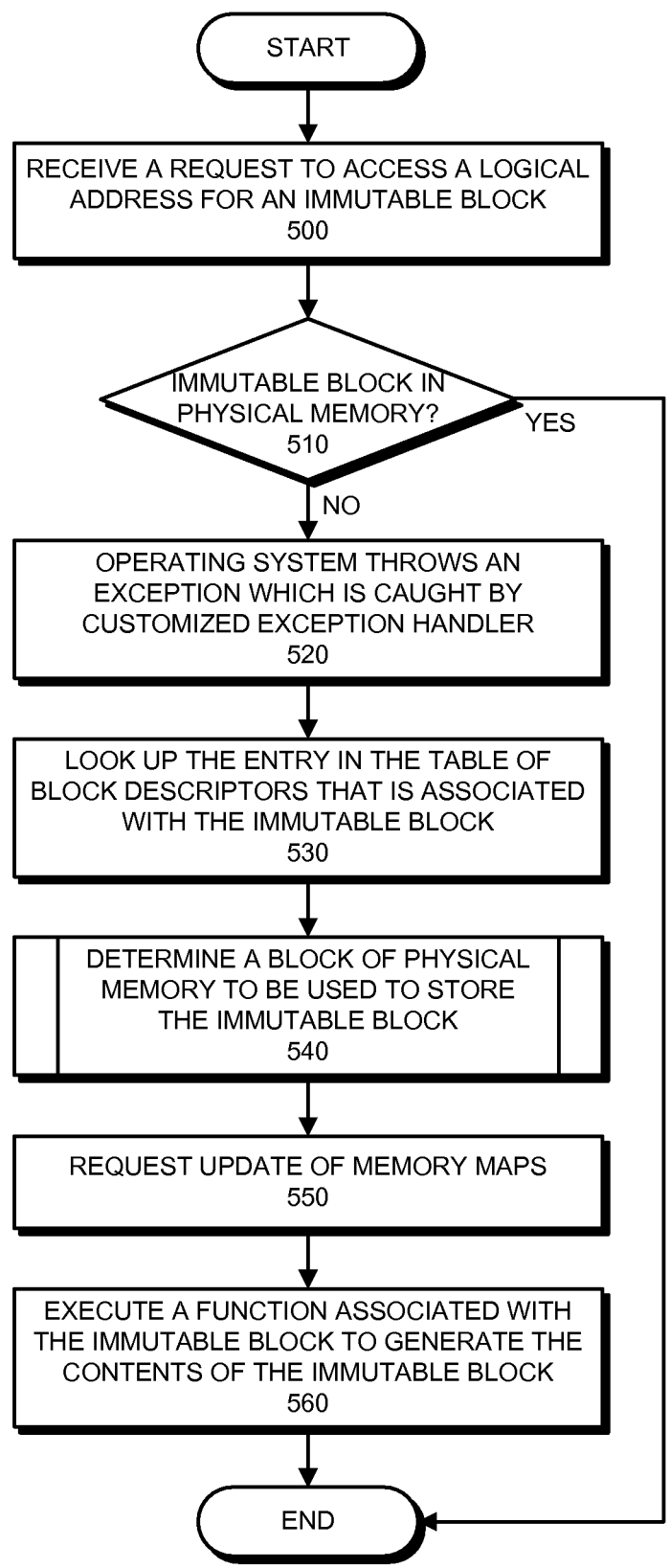
FIG. 5 presents a flow chart illustrating the process of accessing an immutable block in accordance with an embodiment of the present invention.

FIG. 5 presents a flow chart illustrating the process of accessing an immutable block. Note that this process is more general than the process illustrated in FIG. 4, encompassing any access for a statically-initialized table of block descriptors and subsequent accesses to initialized entries in a dynamically-initialized table of block descriptors. During operation, the system receives a request to access a logical address associated with an immutable block (operation 500). The operating system uses a set of memory mappings to determine whether the logical address (and hence the immutable block) is in physical memory (operation 510). If so, the process completes. Otherwise, the operating system throws an exception, which is caught by a customized (application-specified) exception handler (operation 520). In the exception handler, the system looks up the entry in the table of block descriptors that is associated with the immutable block (operation 530), and then determines a block of physical memory in which the immutable block can be stored (operation 540). Note that this may involve finding an empty block and/or evicting an existing block (as described below). Once physical memory is available, the system requests that the operating system update a set of memory maps to reflect that requests for addresses in the immutable block should access the associated block of physical memory (operation 550), and then executes a function associated with the immutable block to generate the contents of the immutable block (operation 560) (as described above for FIG. 4). At this point, the operating system can service the request to access the logical address, and the process completes.

Note that attempts to access logical addresses for immutable blocks that are not loaded into physical memory are caught by the operating system using standard virtual memory management techniques. The use of the application-specific exception handler makes the virtualized access to immutable blocks transparent to the application code, and ensures that no out-of-memory exceptions should ever be thrown for immutable blocks. While such support can be included directly in an operating system, this would require modifying the operating system, which may not be a viable option. Hence, the described techniques facilitate managing immutable blocks from the application-level, and use mapping and unmapping functionalities provided by the operating system to make accessing immutable blocks transparent to the application.

In some embodiments of the present invention, the function used to re-generate the data in the block can vary widely in complexity, for instance ranging from a simple read with a known offset from a known file to a function that: unpacks a set of raw data; verifies the correctness of the raw data; fixes an address for the raw data; patches code in the raw data; and/or compiles the raw data. Note that regenerating an immutable block by executing such a function may involve substantial computational overhead, but can also allow the system to reduce the memory footprint of an application such that an application that could otherwise not execute can now execute. Note that the associated overhead can also depend on application access patterns and how accurately the system can predict which immutable blocks are not likely to be used again. For instance, when an application written in Java™ accesses a class for the first time, the runtime environment needs to execute a class initializer that initializes the class object. After setting up the object, this specific class initializer might not be executed again for some substantial time interval. Furthermore, an application executable may include a large library of such class initializers for classes that may never be used. For an access pattern in which an application loads only a small set of classes, and then does not create any additional new classes for a long time interval, the system can initially load class initializers to initialize the objects (e.g., by loading the immutable blocks containing these class initializers into the immutable region), and then later unload the associated immutable blocks when their space in the immutable region is needed for other immutable data. If needed, the system can always re-generate the blocks and reload them into the immutable region, as needed.

Note that the system can throw a load-related exception if any problems occur the first time the immutable blocks are accessed and loaded into the immutable region, thereby throwing such exceptions in the correct timeframe as specified by the Java™ standard. After an immutable block has successfully loaded once, future re-loads of the same block are unlikely to cause such an exception, given that the first load was already successful. Furthermore, loading immutable blocks should never cause an out-of-memory exception, because the system can always evict another block from the immutable region (if needed) to provide space for a needed block. Note that for correct operation, the functions used to re-generate immutable blocks from raw data should typically not be located in such immutable blocks. For instance, such functions may be generated by a compiler and included in the code section for an application.

Figure 6:
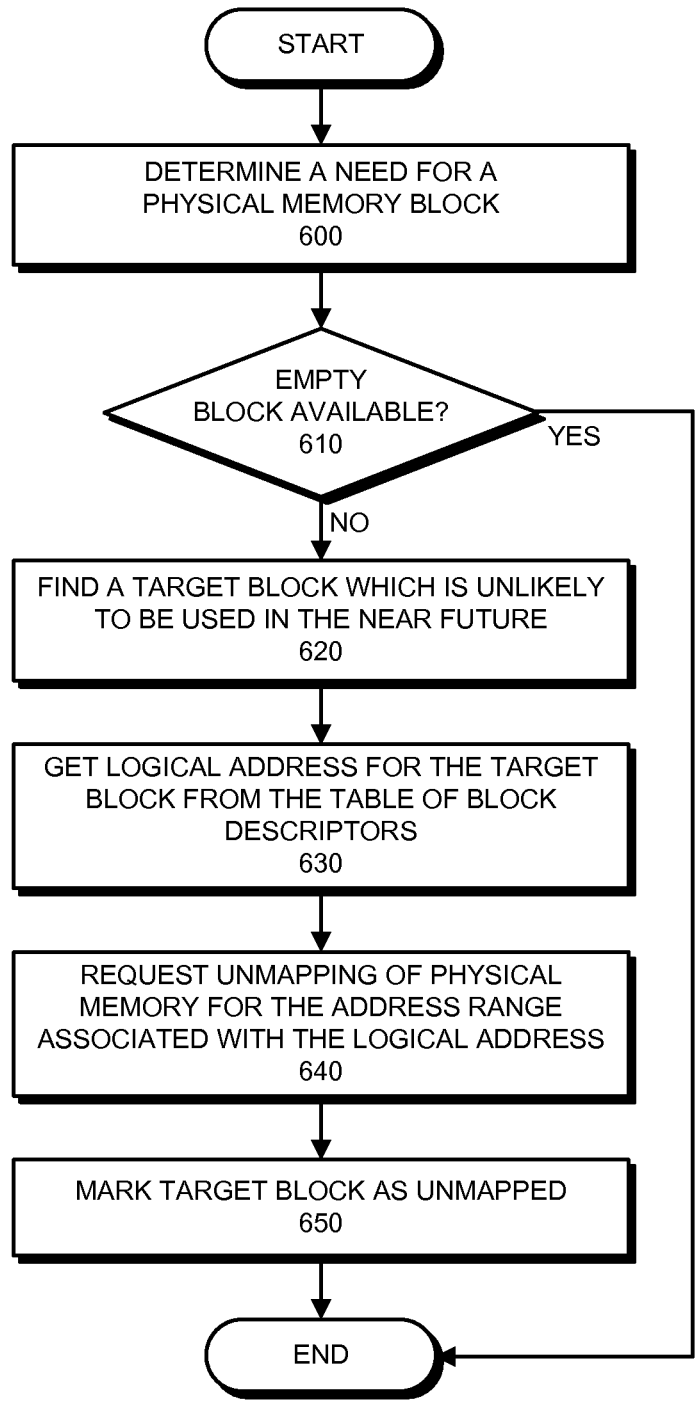
FIG. 6 presents a flow chart illustrating the process of determining an available physical memory block for a needed immutable block in accordance with an embodiment of the present invention.

FIG. 6 presents a flow chart illustrating the process of determining an available physical memory block for a needed immutable block. During operation, the system determines a need for a physical memory block (operation 600). If an empty block is already available (operation 610), the process completes. If not, the system finds a target block which is unlikely to be used in the near future (operation 620). For instance, the system may analyze the statistical information in the entries of the table of block descriptors to find a target block which is unlikely to be used in the near future. The system gets the logical address for the target block from the entry in the table of block descriptors (operation 630), and makes a request to the operating system to unmap the physical memory for the physical address range associated with the logical address (operation 640). At this point, the system can mark the target block as unmapped (operation 650), and can use the freed physical memory that was previously associated with the target block for the needed immutable block.

Figure 7:
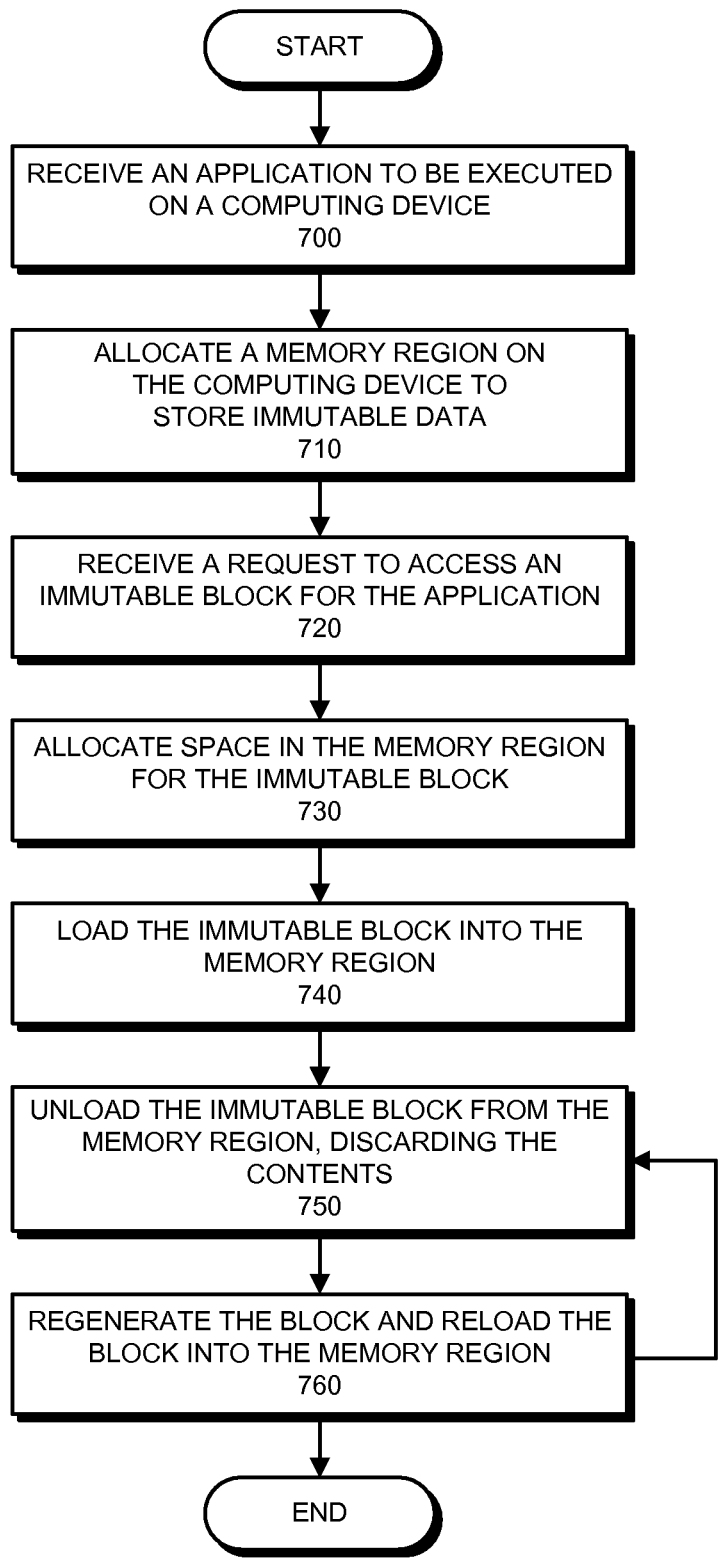
FIG. 7 presents a flow chart illustrating the process of allocating memory for immutable data on a computing device in accordance with an embodiment of the present invention.

FIG. 7 presents a flow chart illustrating the process of allocating memory for immutable data on a computing device. During operation, the system receives an application to be executed on the computing device (operation 700). The system allocates a memory region on the computing device to store immutable data (operation 710). Note that this memory region will typically be smaller than the immutable data for the application. Subsequently, the system receives a request to access an immutable block for the application (operation 720). In response, the system allocates space in the memory region for the immutable block (operation 730), and loads the immutable block into the memory region (operation 740). At some subsequent point, when the space occupied by the immutable block is needed for another block, the system unloads the immutable block from the memory region and discards the contents of the immutable block (operation 750). If the system later detects another access to the data in the immutable block, the system can regenerate the block by transforming raw data associated with the immutable block into a form that can be directly accessed by the application and reloading the immutable block into the memory region (operation 760). Note that the immutable block may be loaded (generated), used for some time by the application, and then unloaded and replaced with another block as many times as needed during execution of the application (as indicated by the arrow looping back from operation 760 to operation 750).

In some embodiments of the present invention, the system tracks and adjusts the size of the immutable region during operation to accommodate the memory needs of an application. For instance, while the allocated immutable region is typically smaller than the sum of the application's immutable data, the actual size of the immutable region may vary depending on how the application uses immutable data, and could potentially be dramatically smaller than this sum. The system can monitor the immutable region and other regions of program memory (such as the object heap) to determine whether these other regions have a pressing need for additional memory, and, if so, can reduce (shrink) or increase the amount of memory allocated for immutable data. For instance, the system can evict a set of immutable blocks from physical memory, and make the now-free memory available to other aspects of the application. Alternatively, if the system finds that the frequency of re-generating immutable blocks is drastically impacting performance, it may expand the immutable region to provide more blocks of physical memory for immutable data.

In some embodiments of the present invention, analysis may erroneously determine a block of application data to be immutable. As a result, the system may, during operation, detect attempts to write data into blocks that were previously assumed to be immutable. Note that such writes violate the correctness of discarding and re-creating such blocks. The system can handle such situations by pinning such written-to blocks into their current block of physical memory, and preventing them from being discarded. For instance, the system may use an additional bit available in the fields of a block descriptor entry as a "dirty bit" that can be set when a write to the associated block is detected. The dirty block becomes fixed in its physical memory block, thereby preserving the written data. Furthermore, the system can make note of the write (e.g., by writing information for the write to a log), so that the block will not be considered immutable for future execution of the application. Note that the capability to detect such writes allows the automatic analysis that detects immutable data to be more aggressive in uncertain cases. Logging writes to immutable blocks can also facilitate fixing errors in the automatic analysis process and thereby make automatic analysis more robust.

In summary, one embodiment of the present invention virtualizes access to potentially large volumes of immutable data. The system allocates a region of the address space for immutable data, and can then dynamically load and unload blocks of immutable data from this region. Next, the system assigns logical addresses to these immutable blocks (either statically or dynamically), loads immutable blocks into the immutable region as needed, and sends requests to the operating system to map the logical addresses for loaded blocks to their associated physical addresses. When no free space is left in the immutable region, the system can use statistical attributes to evict and discard less-needed immutable blocks and thereby free space for other needed blocks. The system manages the immutable region using techniques that assume that insufficient swap space or latency are available but that immutable blocks can be re-generated from scratch using an associated function. Hence, the system can be used to reduce memory loads, thereby potentially reducing the duration of an application's startup phase and garbage collection overhead (e.g., by allowing more space for the object heap). Note that the described techniques can be applied to a wide range of applications on memory-constrained devices (e.g., Java™-enabled mobile telephones, game consoles with large sets of immutable, compressed three-dimensional models and data that need to be unpacked into limited memory, etc).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for allocating memory for immutable data that is associated with an application on a computing device, comprising:
   executing the application using the computing device, wherein executing the application comprises receiving a registration of a customized exception handler at an operating system in the device from the application, wherein the customized exception handler provides application-specific handling for accesses of immutable data in a memory region, and wherein the immutable data is partitioned into a set of blocks while compiling the application for the computing device;
   allocating the memory region on the computing device to store the immutable data, wherein the memory region is smaller than the immutable data;
   while executing the application using the computing device, maintaining a table, wherein, for each given block in the set of blocks, the table includes an entry for the given block that comprises a pointer to a function that generates the immutable data for the given block; and
   in the customized exception handler for the application, performing the operations of:
      upon receiving a request to access a block of the immutable data, allocating space in the memory region for the block and loading the block into the memory region;
      when the space occupied by the block is needed for another block, and no attempt has been made to write to the block, unloading and discarding the block; and
      when the block needs to be accessed again, reloading the block into the memory region,
   wherein loading the block and reloading the block comprises generating the immutable data for the block into the memory region by using the pointer for the block to execute the function for the block.

2. The method of claim 1, wherein loading and reloading the block into the memory region further involves:
   accessing raw data associated with the block;
   using the function for the block to perform a set of operations upon the raw, wherein the operations transform the raw data into a form that can be accessed directly by the application; and
   storing the transformed data into the space allocated for the block.

3. The method of claim 2,
   wherein the computing device includes a constrained memory space that cannot accommodate the entire application;
   wherein the computing device includes a constrained swap space that prevents the block from being swapped out; and wherein discarding and reloading the block facilitates executing programs that could otherwise not run given the constrained memory space and constrained swap space of the computing device.

4. The method of claim 3, wherein the set of blocks comprises uniformly-sized blocks.

5. The method of claim 4, wherein the method further involves:
upon compiling the application, creating the function for each given block in the set of blocks.

6. The method of claim 1, wherein the method reduces the memory used for immutable data during execution while ensuring that exception semantics for the application are not violated.

7. The method of claim 1, wherein loading the block further involves:
identifying a target block to be evicted from the memory region; and
when all of the space in the memory region has been allocated to other blocks, evicting the target block from the memory region.

8. The method of claim 1, wherein a size of the memory region is dynamically adjusted while executing the application based on memory needs of the application.

9. The method of claim 1, wherein the method further involves:
detecting an attempt to write to the block of immutable data, wherein detecting the attempt comprises determining that the block was erroneously declared to be immutable; and
when the attempt is detected, preventing the block from being unloaded from the memory region.

10. The method of claim 1, wherein immutable data includes both data that is read and/or written by application instructions as well as executable application instructions.

11. The method of claim 1, wherein the application:
monitors the memory region to determine how a frequency of regenerating immutable blocks impacts application performance; and
adjusts the amount of memory allocated to the memory region to improve application performance.

12. The method of claim 1, wherein, for each given block in the set of blocks, the function that generates the immutable data for the given block is different from functions for other blocks in the set,
wherein the entry for the given block comprises a logical address that is used by the application to access contents of the immutable block, and indicator that indicates whether the given block is currently loaded into physical memory, and, when the given block is loaded into physical memory, a physical address where the contents of the immutable block are stored,
wherein executing the function for the block comprises storing the contents of the immutable block using the physical address.

13. A non-transitory computer-readable storage medium storing instructions that when executed by a computer cause the computer to perform a method for allocating memory for immutable data that is associated with an application on a computing device, the method comprising:
executing the application using the computing device, wherein executing the application comprises receiving a registration of a customized exception handler at an operating system in the device from the application, wherein the customized exception handler provides application-specific handling for accesses of immutable data in a memory region, and wherein the immutable data is partitioned into a set of blocks while compiling the application for the computing device;
allocating the memory region on the computing device to store the immutable data, wherein the memory region is smaller than the immutable data;
while executing the application using the computing device, maintaining a table, wherein, for each given block in the set of blocks, the table includes an entry for the given block that comprises a pointer to a function that generates the immutable data for the given block; and
in the customized exception handler for the application, performing the operations of:
upon receiving a request to access a block of the immutable data, allocating space in the memory region for the block and loading the block into the memory region;
when the space occupied by the block is needed for another block, and no attempt has been made to write to the block, unloading and discarding the block; and
when the block needs to be accessed again, reloading the block into the memory region,
wherein loading the block and reloading the block comprises generating the immutable data for the block into the memory region by using the pointer for the block to execute the function for the block.

14. The non-transitory computer-readable storage medium of claim 13, wherein loading and reloading the block into the memory region further involves:
accessing raw data associated with the block;
using the function for the block to perform a set of operations upon the raw, wherein the operations transform the raw data into a form that can be accessed directly by the application; and
storing the transformed data into the space allocated for the block.

15. The non-transitory computer-readable storage medium of claim 14,
wherein the computing device includes a constrained memory space that cannot accommodate the entire application;
wherein the computing device includes a constrained swap space that prevents the block from being swapped out; and
wherein discarding and reloading the block facilitates executing programs that could otherwise not run given the constrained memory space and constrained swap space of the computing device.

16. The non-transitory computer-readable storage medium of claim 15, wherein the set of blocks comprises a set of uniformly-sized blocks.

17. The non-transitory computer-readable storage medium of claim 13, wherein the method reduces the memory used for immutable data during execution while ensuring that exception semantics for the application are not violated.

18. The non-transitory computer-readable storage medium of claim 13, wherein loading the block further involves:
identifying a target block to be evicted from the memory region; and
when all of the space in the memory region has been allocated to other blocks, evicting the target block from the memory region.

19. The non-transitory computer-readable storage medium of claim 13, wherein a size of the memory region is dynamically adjusted while executing the application based on the memory needs of the application.

20. The non-transitory computer-readable storage medium of claim 13, wherein the method further involves:
- detecting an attempt to write to the block of immutable data, wherein detecting the attempt comprises determining that the block was erroneously declared to be immutable; and
- when the attempt is detected, preventing the block from being unloaded from the memory region.

21. An apparatus that allocates memory for immutable data that is associated with an application on a computing device, comprising:
- in the computing device, performing the operations of:
  - executing the application using the computing device, wherein executing the application comprises receiving a registration of a customized exception handler at an operating system in the device from the application, wherein the customized exception handler provides application-specific handling for accesses of immutable data in a memory region, and wherein the immutable data is partitioned into a set of blocks while compiling the application for the computing device;
  - allocating the memory region on the computing device to store the immutable data, wherein the memory region is smaller than the immutable data;
  - while executing the application using the computing device, maintaining a table, wherein, for each given block in the set of blocks, the table includes an entry for the given block that comprises a pointer to a function that generates the immutable data for the given block; and
  - in the customized exception handler for the application, performing the operations of:
    - upon receiving a request to access a block of the immutable data, allocating space in the memory region for the block and loading the block into the memory region;
    - when the space occupied by the block is needed for another block, and no attempt has been made to write to the block, unloading and discarding the block; and
    - when the block needs to be accessed again, reloading the block into the memory region,
  - wherein loading the block and reloading the block comprises generating the immutable data for the block into the memory region by using the pointer for the block to execute the function for the block.

\* \* \* \* \*

UNITED STATES PATENT AND TRADEMARK OFFICE
CERTIFICATE OF CORRECTION

PATENT NO. : 8,812,809 B2
APPLICATION NO. : 12/136653
DATED : August 19, 2014
INVENTOR(S) : Pliss et al.

Page 1 of 1

It is certified that error appears in the above-identified patent and that said Letters Patent is hereby corrected as shown below:

In the Claims

In column 14, line 66, in Claim 19, delete "on the" and insert -- on --, therefor.

Signed and Sealed this
Tenth Day of March, 2015

Michelle K. Lee
*Deputy Director of the United States Patent and Trademark Office*